United States Patent [19]

Powers et al.

[11] Patent Number: 5,203,897
[45] Date of Patent: Apr. 20, 1993

[54] METHOD FOR MAKING A PREFORM DOPED WITH A METAL OXIDE

[75] Inventors: Dale R. Powers, Painted Post, N.Y.; Kenneth H. Sandhage, Randolph, Mass.; Michael J. Stalker, Clifton Park, N.Y.

[73] Assignee: Corning Incorporated, Corning, N.Y.

[21] Appl. No.: 856,454

[22] Filed: Mar. 24, 1992

Related U.S. Application Data

[63] Continuation of Ser. No. 435,966, Nov. 13, 1989, abandoned.

[51] Int. Cl.$^5$ .......................................... C03B 37/018
[52] U.S. Cl. ...................................... 65/3.12; 65/18.2; 65/144
[58] Field of Search ........................ 65/3.12, 18.2, 144

[56] References Cited

U.S. PATENT DOCUMENTS

| | | | |
|---|---|---|---|
| 3,698,936 | 10/1972 | Moltzan | 65/3.2 |
| 4,165,223 | 8/1979 | Powers | 65/60.6 |
| 4,165,224 | 8/1979 | Irven et al. | 65/3.12 |
| 4,230,744 | 10/1980 | Blankenship | 427/163 |
| 4,314,833 | 2/1982 | Kuppers | 65/3.12 |
| 4,314,837 | 2/1982 | Blankenship | 65/3.12 |
| 4,345,928 | 8/1982 | Kawachi et al. | 65/18.2 |
| 4,406,680 | 9/1983 | Edahiro et al. | 65/18.2 |
| 4,417,911 | 11/1983 | Cundy et al. | 427/45.1 |
| 4,465,708 | 8/1984 | Fanucci et al. | 65/3.12 |
| 4,529,427 | 7/1985 | French | 65/3.12 |
| 4,627,866 | 12/1986 | Kanamori et al. | 65/3.2 |
| 4,801,322 | 1/1989 | Suda et al. | 65/144 |

FOREIGN PATENT DOCUMENTS

| | | |
|---|---|---|
| 0185106 | 6/1986 | European Pat. Off. |
| 0213715 | 11/1987 | European Pat. Off. |
| 3518620A1 | 11/1986 | Fed. Rep. of Germany |
| 55-23068(A) | 2/1980 | Japan |
| 55-144432 | 11/1980 | Japan |
| 59-107934(A) | 6/1984 | Japan |
| 61-83642 | 4/1986 | Japan |

OTHER PUBLICATIONS

M. Elder & D. Powers; "Profiling of Optical Waveguide Flames" Technical Digest for the 1986 Conf. on Optical Fiber Communication; Atlanta, Georgia, p. 74, 1986.

Edahiro et al; "Deposition Properties of High-Silica Particles in the Flame Hydrolysis Reaction for Optical Fiber Fabrication" Japanese Journal of Applied Physics; vol. 19, No. 11; Nov. 1980; pp. 2047-2054.

Kawachi et al; "Deposition Properties of $SiO_2$-$GeO_2$ Particles in the Flame Hydrolysis Reaction for Optical Fiber Fabrication"; Japanese Journal of Applied Physics; vol. 19, No. 2; Feb. 1980; pp. L69-L71.

Optical Fiber Communications, vol. 1,; 1985; Bell Telephone Labs., Inc., sections 3.3.2.3 and 3.3.2.4; pp. 109-113.

Sanada et al.; "Behavior of $GeO_2$ in Dehydration and Consolidation Processes of the VAD Method"; Technical Digest for the 1984 Conference of Optical Fiber Communication; New Orleans; p. 26; 1984.

Primary Examiner—W. Gary Jones
Assistant Examiner—Charles K. Friedman
Attorney, Agent, or Firm—K. McNeill Taylor, Jr.

[57] ABSTRACT

An improved method for making preforms by vapor deposition soot laydown processes is provided wherein an oxidizing atmosphere is used during at least part of the laydown process, e.g., during the laydown of the center portion of the preform. The use of such an atmosphere has been found to result in enhanced dopant capture, reduced axial trends, and an overall stabilization of the laydown process. A method for selecting burner flows which optimize the laydown process is also provided.

11 Claims, 6 Drawing Sheets

18  19  20  21
Segment No.

Segment No. 20

METHOD FOR MAKING A PREFORM DOPED WITH A METAL OXIDE

CROSS-REFERENCE TO RELATED APPLICATION

This application is a continuation of U.S. patent application Ser. No. 07/435,966 entitled Method for Making a Preform Doped with a Metal Oxide (D. R. Powers et al.) filed Nov. 13, 1989, now abandoned.

I. BACKGROUND OF THE INVENTION

A. Field of the Invention

This invention relates to optical waveguide fibers and, in particular, to an improved method for making a preform doped with a metal oxide from which such fibers can be produced.

B. Description of the Prior Art

As is known in the art, optical waveguide fibers consist of a higher index of refraction core surrounded by a lower index of refraction cladding. Depending on the type of fiber and its desired performance characteristics, the radial distribution of the index of refraction across the face of the fiber can be simple or complex. For example, single mode fibers typically have an index of refraction profile which is a simple step, i.e., a substantially uniform refractive index within the core and a sharp decrease in refractive index at the core-cladding interface. On the other hand, to produce a high bandwidth multimode fiber requires achieving a nearly parabolic radial refractive index profile in the fiber core so as to minimize intermodal dispersion. See R. Olshansky, "Propagation in Glass Optical Waveguides", *Reviews of Modern Physics*, Vol. 51, No. 2, April, 1979, pages 341–367.

Optical waveguide fibers can be prepared by various techniques known in the art. The present invention is concerned with those techniques wherein a porous soot preform is formed and then consolidated. More particularly, the invention is concerned with vapor deposition soot laydown techniques for producing preforms.

Preforms produced by vapor deposition techniques typically are composed of silicon dioxide ($SiO_2$) selectively doped with at least one metal or metalloid oxide (referred to generally herein as a "metal oxide") to provide the desired index of refraction profile. The preferred metal oxide dopant in commercial use today is germanium dioxide ($GeO_2$), although other metal oxides, such as, titanium oxide, tantalum oxide, lanthanum oxide, antimony oxide, aluminum oxide, and the like, as well as mixtures of metal oxides, can be used as dopants. Since metal oxide dopants are one of the more expensive raw ingredients used in the preparation of optical waveguide fibers, it is important that the dopant be effectively incorporated in the preform with a minimum of loss.

In accordance with one vapor deposition technique, outside vapor deposition or "OVD", soot particles are formed by oxidizing and/or hydrolyzing halide materials, e.g., $SiCl_4$ and $GeCl_4$, in a burner. The preform is formed from the soot particles by moving the burner back and forth along the length of a rotating mandrel. See, for example, Bailey et al., U.S. Pat. No. 4,298,365. The distance between the mandrel and the burner is selected so that the soot particles collect on the mandrel in thin layers with each pass of the burner. The amount of halide materials supplied to the burner is adjusted during the soot laydown process so as to produce a dopant concentration in the preform which varies with radius. This dopant concentration profile is selected so that the finished fiber will have the desired index of refraction profile.

The burners used in soot laydown processes, such as the OVD process, have multiple orifices or outlet structures. The orifices carry the halide materials, the fuel for the burner, and oxygen for reaction with the fuel and the halide materials. Depending on the burner design and the specifics of the material being deposited, the various orifices can contain one or a mixture of these reactants. In addition, some of the orifices can carry inert gases, either alone or mixed with reactants, to serve as carriers or means for controlling the shape and temperature profile of the burner's flame. A typical burner design is shown in Moltzan, U.S. Pat. No. 3,698,936: a discussion of the temperature characteristics of the flame produced by such burners can be found in M. Elder and D. Powers, "Profiling of Optical Waveguide Flames", *Technical Digest for the 1986 Conference on Optical Fiber Communication*, Atlanta, Ga., page 74, 1986.

In the OVD process, once soot laydown has been completed, the mandrel is removed from the center of the preform, and the preform is mounted on a hollow handle. The preform is then ready for drying and consolidation in a consolidation oven. Drying and consolidation are accomplished by heating the porous preform to its sintering temperature and surrounding the preform with one or more drying gases, e.g., a mixture of helium and chlorine gas, and by passing such gases through the handle and down the center of the preform. Alternatively, drying gases can only be applied to the centerline of the preform. See, for example, Powers, U.S. Pat. No. 4,165,223. During the drying/consolidation process, once the preform pores are significantly closing, the flow of the drying gases may be stopped. The consolidation is performed sequentially over the length of the preform, with the tip of the preform being consolidated first and the portion of the preform near the handle being consolidated last.

Ideally, the consolidated preform should have uniform characteristics along its length. In practice, however, it has been found that the consolidation process results in "axial trends" along the length of the consolidated preform such that fiber produced from the tip of the preform has different properties from that produced from the middle of the preform, and fiber produced from the middle has different properties from that produced from the handle end.

These differences are plainly undesirable for numerous reasons. For example, the differences result in greater variability in the finished product. Moreover, if sufficiently large, the differences can result in unacceptable (rejected) material which does not meet the quality control standards for the product. This waste, in turn, results in higher production costs. In view of these and other problems, one of the primary goals of the present invention is to minimize the differences between fibers produced from different portions of the consolidated preform.

Some experimental studies of the behavior of metal oxides and, in particular, germanium dioxide (germania) during soot laydown have been performed. For example, Edahiro et al. have performed experiments which suggest that germania is deposited as a crystalline structure, not integrated with silica particles, when the temperature of the substrate upon which the deposition is occurring is below about 400° C. On the other hand, when the temperature of the substrate is above about 500° C., the germania is said to exist in a noncrystalline form dissolved in silica particles. See Edahiro et al., "Deposition Properties of High-Silica Particles in the Flame Hydrolysis Reaction for Optical Fiber Fabrication", *Japanese Journal of Applied Physics*, Vol 19, No. 11, November, 1980, pages 2047-2054. See also Kawachi et al., "Deposition Properties of $SiO_2$-$GeO_2$ Particles in the Flame Hydrolysis Reaction for Optical Fiber Fabrication", *Japanese Journal of Applied Physics*, Vol. 19, No. 2, February 1980, pages L69-L71: and *Optical Fiber Communications*, vol. 1, 1985, Bell Telephone Laboratories, Inc., sections 3.3.2.3 and 3.3.2.4, pages 109-113.

Similarly, Sanada et al. have suggested that in the vapor axial deposition (VAD) soot laydown process, the germanium located in the central portion of the preform consists of glass particles composed of a solid solution of $GeO_2$ and $SiO_2$, while in the peripheral parts of the preform, a large percentage of the germania is in a hexagonal crystalline form. Sanada et al. ascribe these differences to differences in the temperature of the various parts of the preform as the deposition process takes place. See Sanada et al., "Behavior of $GeO_2$ in Dehydration and Consolidation Processes of the VAD Method", *Technical Digest for the* 1984 *Conference on Optical Fiber Communication*, New Orleans, page 26, 1984. Sanada et al. have also stated that the presence of hexagonal $GeO_2$ can affect the lengthwise fluctuation of refractive index profile during the dehydration of VAD preforms since this form of $GeO_2$ is easily halogenated. Sanada's proposed solution to the problem is to adjust the dehydration process so that the hexagonal $GeO_2$ is removed. See Sanada et al., "Behavior of $GeO_2$ in Dehydration Process of VAD Method", *Digest of 7th ECOC*, Copenhagen, pages 2.1-1-2.1-4, 1981.

U.S. Pat. No. 4,627,866 and EPO Patent Publication No. 185,106 to Kanamori et al. are concerned with a VAD process in which fluorine is added in the soot laydown process. These references describe using higher oxygen partial pressures to aid in the addition of fluorine to a silica preform. The purpose of the increased oxygen partial pressures in these references is to thoroughly decompose fluorine-containing material (e.g. $CCl_2F_2$, $CF_4$, etc.) so that "further fluorine is effectively added" and "enough fine glass particles are synthesized." (U.S. Pat. No. 4,627,866, col. 2, lines 34-39). Significantly, the references contain no disclosure of the concept of providing oxygen to a burner inside of the burner's outermost fuel passageway in an amount greater than that which is stoichiometrically required to fully oxidize the fuel leaving the burner. In addition, the references do not disclose or suggest reducing the amount of undesired forms of a metal oxide which are generated during the creation of a porous glass preform and which can migrate along the length of the preform.

Although $GeCl_4$ is mentioned in the Kanamori et al. references as a "gaseous glass raw material" for "synthesizing fine glass particles", there is no disclosure of any of the forms of the germanium/oxygen metal oxide or the relationship between the proportion of oxygen in the burner gas flows and the resulting forms of germanium/oxygen. These references are directed at the effect of oxidizing atmospheres on the deposition of fluorine-containing material, and they neither disclose nor suggest the use of such atmospheres to reduce axial trends in preforms by reducing the amount of undesirable forms of a metal oxide which tends to migrate during subsequent reheating. The only suggested use of such atmospheres in connection with the formation of germania requires the presence of a fluorine-containing material, which presence clearly impacts the effect of the oxidizing atmosphere.

II. SUMMARY OF THE INVENTION

In view of the foregoing state of the art, it is an object of this invention to improve the vapor deposition laydown process for producing porous soot preforms doped with a metal oxide. More particularly, the objects of the invention include: 1) reducing the amounts of metal oxide dopants used in the formation of soot preforms, 2) reducing the axial trends of consolidated soot preforms and optical waveguide fibers produced from such preforms, and 3) reducing the sensitivity of the soot laydown process to changes in burner flows.

To achieve these and other objects, the invention provides a stabilized soot laydown process in which 1) the efficiency of metal oxide incorporation into soot preforms is increased and 2) the tendency of such oxides to move both radially and axially during laydown and consolidation is reduced. The stabilization is achieved by controlling the oxygen and fuel flows to the soot burner during soot laydown. Specifically, these flows are adjusted so that at least during the critical portions of the laydown process, e.g., when the center part of the core is being laid down, the amount of oxygen available for reaction with the fuel is stochiometrically in excess of the amount of oxygen needed to fully oxidize the fuel. More particularly, the fuel flow(s) through the burner and the oxygen flow(s) (if any) directly mixed with the fuel plus the oxygen flow(s) (if any) inboard of the outermost fuel flow (collectively referred to herein as the "oxygen inside the burner's outermost fuel passage") are adjusted to achieve this full oxidation condition.

As discussed and illustrated by the examples presented below, by maintaining this full oxidation condition, the amount of dopant-containing raw material needed to produce preforms is reduced and, at the same time, axial trends in consolidated preforms and finished fiber are also reduced. In addition, the overall dopant incorporation process is improved in the sense that it becomes less sensitive to changes (perturbations) in the reactant, oxygen, and fuel flows through the burner.

The foregoing principles of the invention are further explained and illustrated by the discussion which follows and by the accompanying drawings, which are incorporated in and constitute part of the specification. It is to be understood, of course, that both the drawings and the description are explanatory only and are not restrictive of the invention.

III. BRIEF DESCRIPTION OF THE DRAWINGS

Figure 3A:
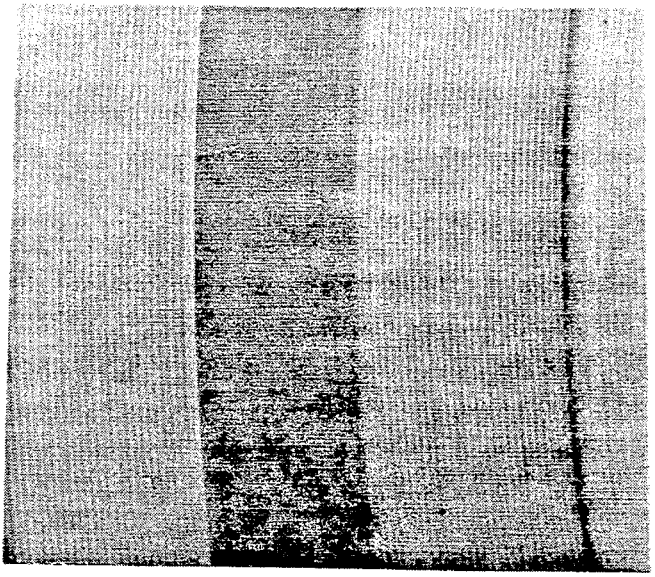
Figure 3B:
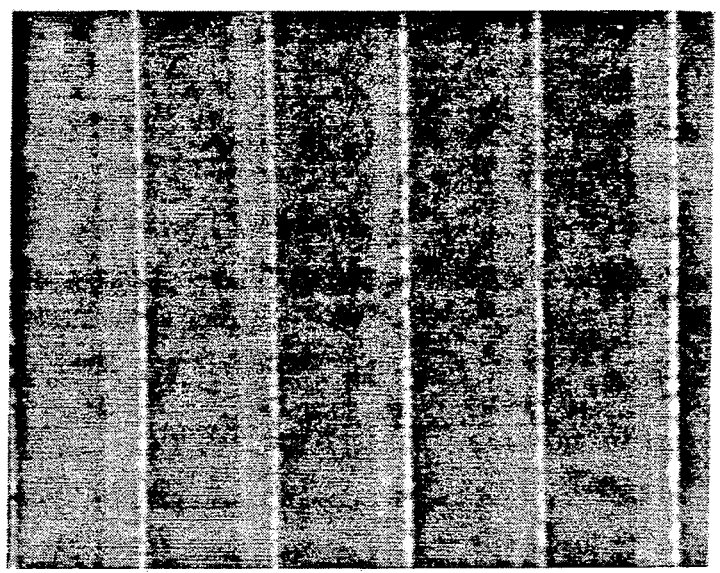

FIG. 3 shows back-scattered electron images of the mid specimen of test blank 3. FIG. 3a was taken at a magnification of 40 × and shows the striae of segments 18 through 21. FIG. 3b was taken at a magnification of 1000× and shows the striae of segment 20.

Figure 4:
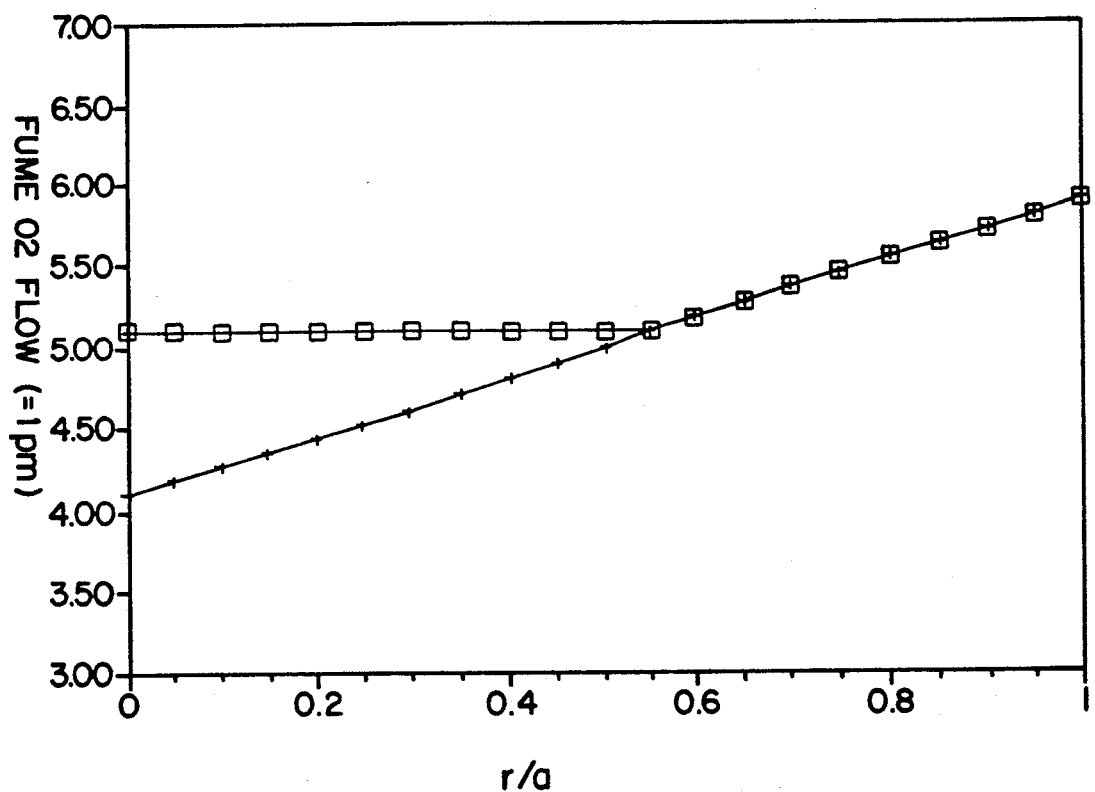
Figure 5:
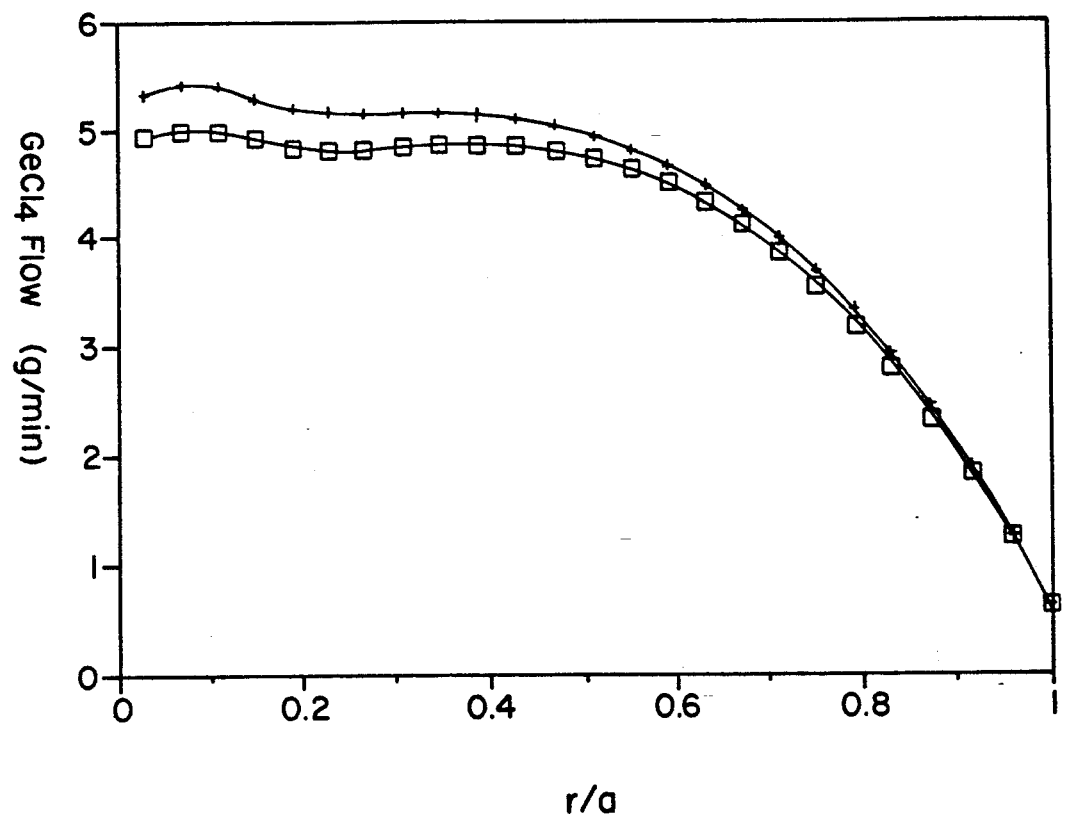

FIGS. 4 and 5 show oxygen flows (FIG. 4) and $GeCl_4$ flows (FIG. 5) as a function of normalized radius (r/a) during the laydown of an OVD preform. The oxygen/fuel stoichiometric ratio was oxidizing during centerline laydown for the points identified by squares and was non-oxidizing for the points identified by plus signs.

Figure 6:
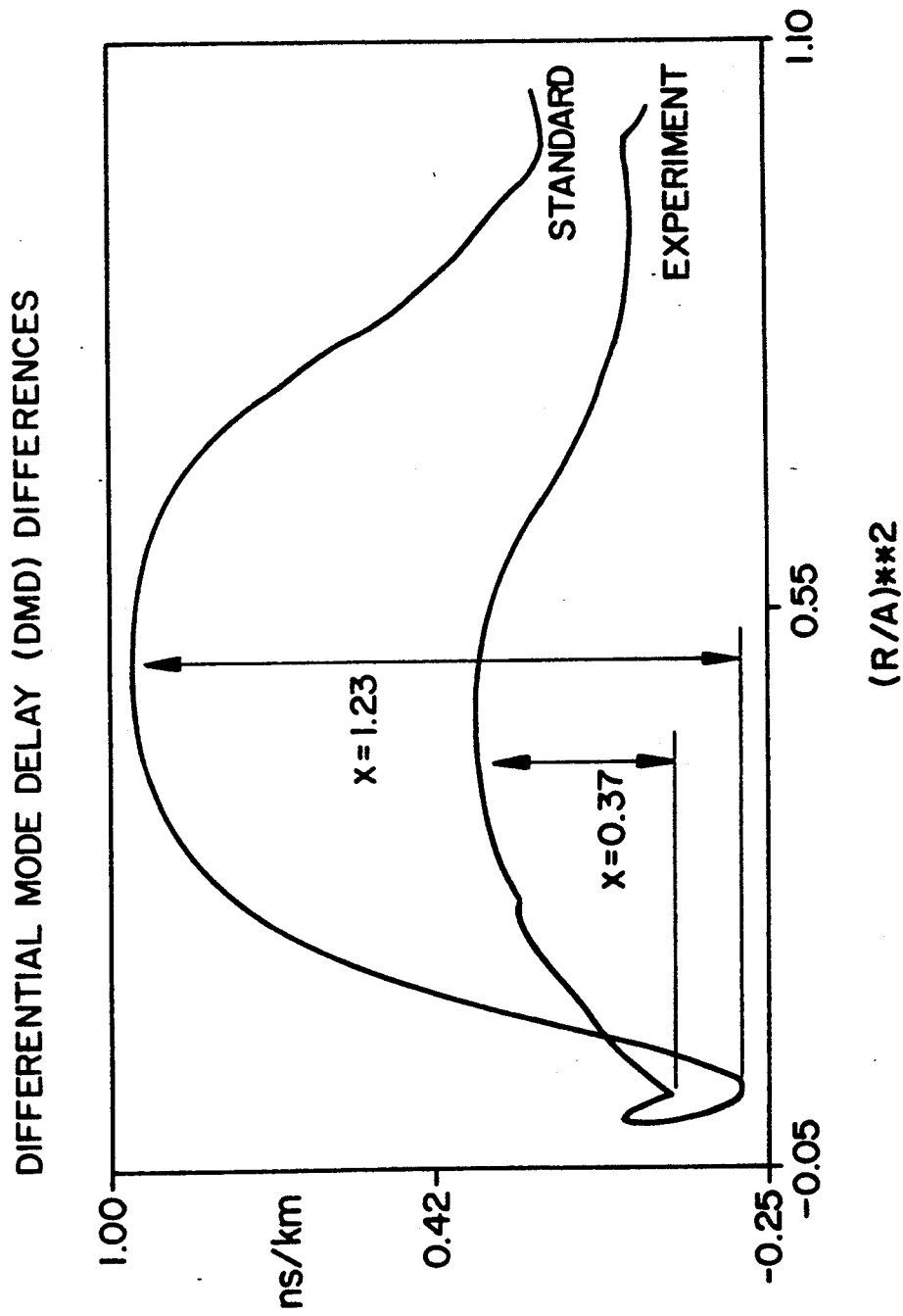

FIG. 6 is a plot of the difference in differential mode delay (DMD) between fiber prepared from tip and middle cane as a function of normalized fiber radius squared $((r/a)^2)$. The "standard" curve represents the results obtained with the nonoxidizing flows of FIGS. 4 and 5, i.e., the flows identified by plus signs, while the "experiment" curve represents the results obtained with the oxidizing flows of those figures, i.e., the flows identified by squares.

IV. DESCRIPTION OF THE PREFERRED EMBODIMENTS

A. Introduction

As discussed above, the present invention is concerned with increasing the efficiency with which metal oxide dopants are incorporated into soot preforms and with reducing the tendency of such dopants to migrate in preforms during laydown and consolidation. The discussion which follows is specifically directed to the use of germanium dioxide as the dopant, it being understood that this discussion is equally applicable to other metal oxide dopants now in use or which may be used in the future to prepare optical waveguide fibers including, without limitation, such dopants as titanium oxide, tantalum oxide, lanthanum oxide, antimony oxide, aluminum oxide, and boric oxide.

Figure 1:
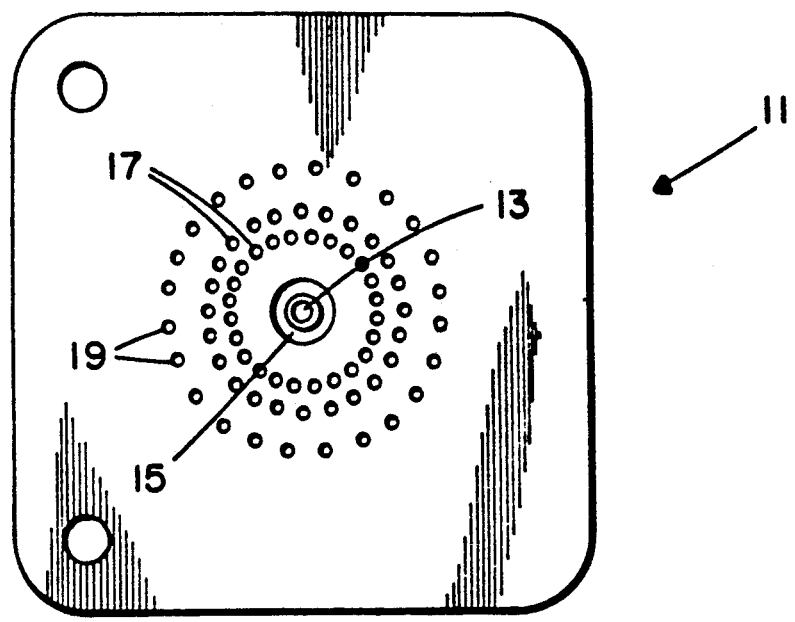
FIG. 1 shows the top surface of a soot laydown burner having a fume tube, an inner-shield oxygen-carrying annulus, two sets of fuel/pre-mix oxygen orifices, and a set of outer-shield orifices.

In addition, the following discussion is in terms of an soot laydown system in which the raw materials are $SiCl_4$, $GeCl_4$, $O_2$, and $CH_4$, and the burner has a configuration of the type shown in FIG. 1. As illustrated in this figure, burner 11 includes a central fume tube 13 through which passes a mixture of $SiCl_4$, $GeCl_4$, and $O_2$, an inner-shield annulus 15 around tube 13 through which passes $O_2$, two sets of fuel orifices 17 through which pass a mixture of $CH_4$ and $O_2$ (the oxygen used to form this mixture is hereinafter referred to as "pre-mix oxygen"), and a set of outer-shield orifices 19 through which pass $O_2$. The inner-shield annulus may be replaced with a set of orifices or a porous region or ring, if desired.

It is to be understood that the invention is applicable to soot laydown systems, including, but not limited to, OVD systems, now in use or subsequently developed which employ different raw materials and/or different burner configurations.

Similarly, the invention can be used to produce various types of optical waveguide fibers, including single mode and multimode fibers. In particular, the invention may be used to reduce axial trends in the manufacture of single mode optical fiber, improving the consistency of mode field diameter and cutoff wavelength and allowing enhanced control of dispersion. The invention is of particular value with regard to high bandwidth multimode fibers (bandwidth greater than or equal to 600 MHz.km) because of the tight tolerances which must be maintained on the index of refraction profile for this type of fiber.

As discussed above, in accordance with the invention, the flows through the soot laydown burner are adjusted so as to produce an oxidizing atmosphere at least during the laydown of the more critical parts of the preform, e.g., those parts most subject to dopant migration such as the center portion (centerline) of the core which is known to be subject to a centerline dip in dopant concentration. Oxidizing atmospheres can also be used during non-critical parts of the laydown process, including throughout the entire laydown procedure if desired.

As used herein, flows through the burner are considered oxidizing when the moles of oxygen available for reaction with the fuel are in excess of the number of moles needed to fully oxidize the fuel. For example, full oxidation of one mole of methane requires two moles of oxygen:

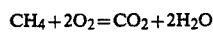

$$CH_4 + 2O_2 = CO_2 + 2H_2O$$

while in the case of hydrogen, only a half a mole of oxygen is needed for each mole of fuel:

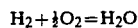

$$H_2 + \tfrac{1}{2}O_2 = H_2O$$

In the present invention, the oxygen flows used in determining if an oxidizing condition exists are those which are directly mixed with the fuel plus those that are inboard of the fuel flow, i.e., in the burner's outermost fuel passageway and inside this passageway. The function of the increased oxygen flows is to burn the fuel completely, preventing the creation of reducing combustion products, and to fully oxidize the $SiCl_4$ and $GeCl_4$. Oxygen supplied in the burner's outermost fuel passageway and inside this passageway may be used to substantially control the chemical reaction within the burner flame, whereas oxygen supplied outside this outermost fuel passageway is primarily for shaping the burner flame and does not provide substantial control of the chemical reaction in the flame.

For example, in the case of the burner of FIG. 1, the pre-mix oxygen, the oxygen passing through the inner-shield annulus and the oxygen passing through the fume tube are used to determine whether or not there is an oxidizing atmosphere. If the ratio of the sum of these oxygen flows to twice the methane flow (or one half the hydrogen flow, if hydrogen is the fuel) is greater than one, then the burner is being operated under the oxidizing conditions called for by the present invention. On the other hand, if the foregoing ratio is less than one, as in the prior art, then the burner is not producing an oxidizing atmosphere. The flows to be compared for other burner configurations will be evident to persons skilled in the art from the disclosure herein.

B. General Considerations

Under the operating conditions and temperatures of the vapor deposition soot laydown process, germanium can exist in three forms: $GeCl_4$ (the halide, raw material form), GeO (the monoxide form), and $GeO_2$ (the dioxide form). $GeO_2$ is the desired form, with $GeCl_4$ and GeO being the forms which lead to reduced germania collection during laydown and increased germania migration during laydown and consolidation. As discussed above, reduced germania collection is plainly undesirable since it increases raw materials costs. As also discussed above, non-uniform germania migration along the length of the soot blank results in a non-uniform refractive index profile in the consolidated blank. This non-uniformity in the blank, in turn, results in a non-uniformity of fibers drawn from different parts of the blank. Specifically, in the case of high bandwidth multimode fibers, these differences manifest themselves as fibers having different bandwidths for different lengths of the fiber, which is plainly undesirable.

Figure 2:
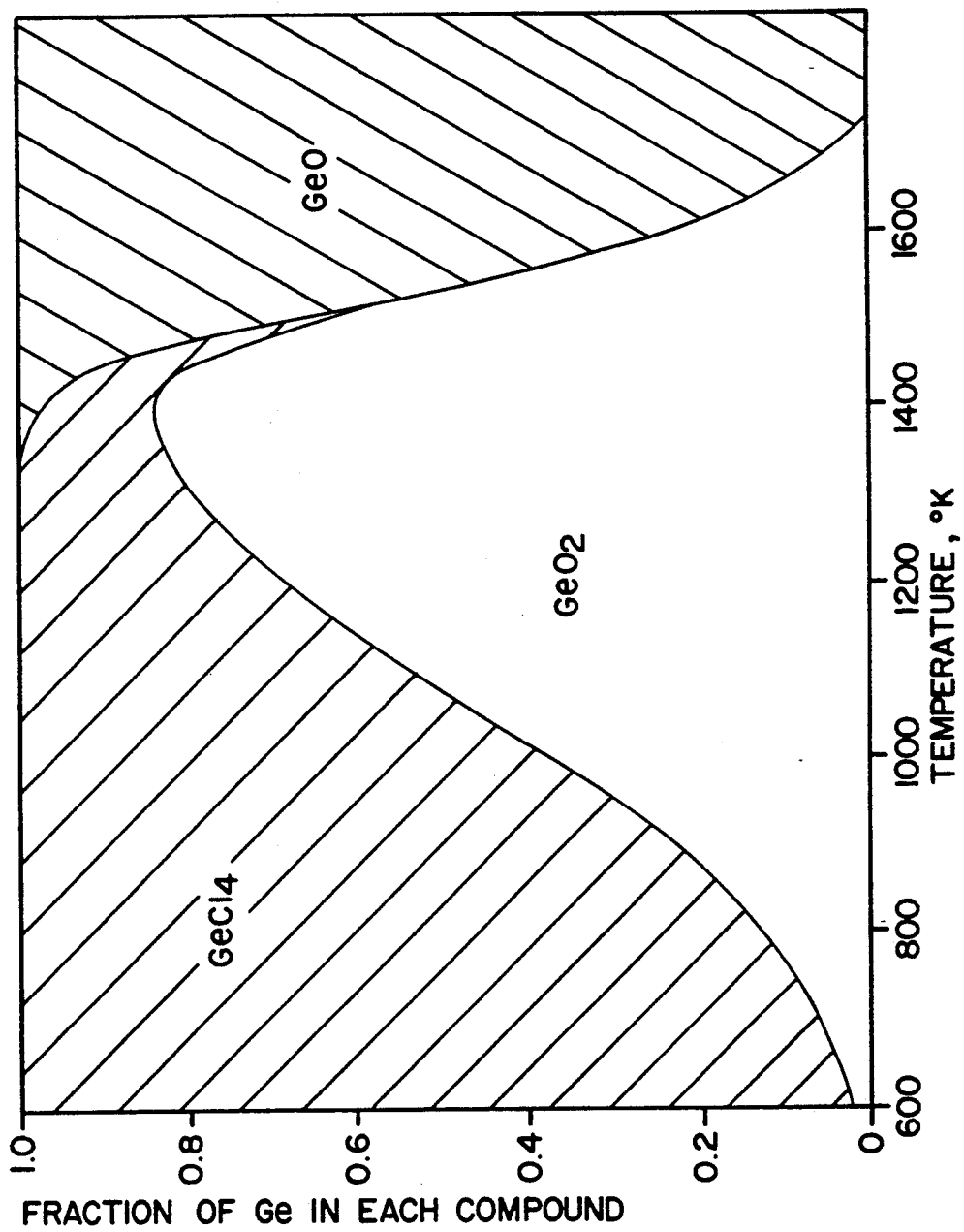
FIG. 2 shows the fraction of Ge as $GeCl_4$, $GeO_2$, and GeO as a function of temperature under equilibrium conditions.

The present invention addresses both these problems by providing soot laydown operating conditions which stabilize germanium in the preform in its $GeO_2$ form. The laydown stability which the invention provides can be visualized with the aid of FIG. 2. This figure is a plot under equilibrium conditions of the fraction of germanium in each of its three states ($GeO(g)$, $GeCl_4(g)$, or $GeO_2$) as a function of temperature for a given oxygen partial pressure. The plot was derived from the thermodynamic data of L. V. Gurvich, "Thermodin Svoistva Individualnykh Veshchestv," Academy of Sciences of USSR, Vol. II, 1979.

As shown in this plot, the fraction of germanium in the $GeO_2$ state increases as the temperature increases, until, at a sufficiently high temperature, $GeO(g)$ begins forming in appreciable amounts. Beyond this temperature, the fraction of germanium as $GeO_2$ drops precipitously with increasing temperature.

Accordingly, in terms of temperature under equilibrium or near-equilibrium conditions, the preferred (stable) region in which to operate would be just to the left of the peak in the $GeO_2$ area. In this temperature region, the fraction of germanium retained as $GeO_2$ is large and the change in that fraction with temperature is relatively small, so that moderate changes in temperature would not result in large changes in the fraction of germanium that formed as $GeO_2$.

Of course, the soot laydown process is not performed under equilibrium conditions and temperature is not the only variable which affects the process. However, by analogy to FIG. 2, the present invention provides operating conditions wherein the process is more stable in terms of germania capture and migration. Rather than temperature being the independent variable, however, as in FIG. 2, the independent variables are the various flows through the soot laydown burner, e.g., methane flow, pre-mix oxygen flow, fume oxygen flow, inner-shield oxygen flow, and total reactant fume flow ($SiCl_4 + GeCl_4$). By analogy to the reasoning applied above to FIG. 2, these variables are selected so as to 1) increase germania capture, 2) decrease germania migration, and 3) provide operating conditions which are relatively insensitive to perturbations in the various flows, i.e., conditions under which the process is operated in a "flatter", more stable region of flow space analogous to the region just to the left of the $GeO_2$ peak in FIG. 2.

In view of the dynamic and interactive nature of the vapor deposition soot laydown process, selecting flow conditions to achieve these results requires consideration of a variety of interrelated phenomena. The basic chemical equation which governs the transformation of $GeO_2$ to $GeO$ is as follows:

$$2GeO_2 = 2GeO(g) + O_2(g) \qquad (1)$$

The thermodynamic data of Gurvich, supra, indicate that this reaction is quite temperature sensitive. For example, at any given oxygen partial pressure and $GeO_2$ activity, the equilibrium partial pressure of $GeO(g)$ over pure $GeO_2$ increases by a factor of about 9200 as the temperature increases from 1130° C. to 1530° C. Thus, the effect of burner flows on temperature is one of the interrelated factors which plays an important role in germania collection and migration.

From a phenomenological point of view, variations in $GeO_2$ concentrations in soot blanks during laydown can result from: 1) a change in the relative amounts of $GeO(g)$ and $GeO_2$ that form in the fume stream prior to soot particle deposition on the blank or 2) a change in the amount of germania that migrates (as $GeO(g)$) from the surfaces of soot particles after deposition on the soot blank. In other words, $GeO(g)$ can form in the fume stream prior to soot deposition, or from the decomposition of $GeO_2$ in soot particles after deposition, for example, during reheating by subsequent burner passes in the OVD soot laydown process. Moreover, some of the $GeO(g)$ formed in the fume stream can condense as $GeO_2$ on cooler soot particles, not directly exposed to the hotter parts of the burner flame.

In addition to these effects, germania can apparently exist in soot particles in various forms. Thus, thermogravimetric analysis of soot blanks has revealed that a fraction of the germania in a soot blank is highly mobile in the presence of chlorine or carbon monoxide. This suggests that at least some of the total deposited germania exists as pure $GeO_2$, not integrated with silica. This pure $GeO_2$ could exist as a germania-rich skin coating germania-silica soot particles. On the other hand, scanning transmission electron microscopic analysis has indicated that some soot particles consist of either pure silica or pure germania.

All of these considerations play a role in determining germania collection efficiency and migration. In accordance with the invention, it has been found that this highly interconnected system can be optimized for increased germania collection and reduced germania migration by controlling the oxygen flows through the burner so as to produce an oxidizing atmosphere.

More particularly, it has been found that collection efficiency is improved and migration is reduced by increasing one or more of fume oxygen, inner-shield oxygen, and pre-mix oxygen, the effects of increases in fume oxygen and inner-shield oxygen being most pronounced. The reasoning underlying these changes is as follows.

From equation 1 above and the Gurvich thermodynamic data, the amount of $GeO(g)$ formed in the fume stream is a function of the oxidation state and temperature of the fume stream. The oxidation state of the fume stream is most strongly affected by fume oxygen, inner-shield oxygen, and reactant fume flows, with the pre-mix oxygen and methane flows having less effect. Increases in fume oxygen and inner-shield oxygen result in a fume stream having a higher oxidation state, while increases in reactant fume flows result in a lower oxidation state.

The temperature distribution within the flame is affected most strongly by the methane, pre-mix oxygen, and inner-shield oxygen flows, with increased pre-mix oxygen and inner-shield oxygen relative to methane resulting in a cooler flame. Increased inner-shield oxygen flow in particular reduces the temperature of the fume stream by inhibiting the oxidation of $CH_4$ near the edge of the fume stream.

As to the formation of $GeO(g)$ by heating of deposited $GeO_2$-rich soot particles with the burner, this effect is primarily a function of the surface temperature of the blank. Flame temperature is most strongly affected by the methane and pre-mix oxygen flows, with pre-mix oxygen relative to methane either less than or in excess of stoichiometric flows resulting in lower flame temperatures. On the other hand, it has been observed that maximum preform surface temperature occurs at pre-mix oxygen relative to methane flows that are less than stoichiometric.

In view of these considerations, increased fume oxygen flow, increased inner-shield oxygen flow, and at least to some extent increased pre-mix oxygen flow all result in a reduction in the amount of GeO(g) formed either in the fume stream or on the surface of the deposited soot particles. The methane and reactant flows also play a role, but to a lesser extent. Specifically, decreases in methane flow, as well as in total reactant fume flow, increase the effective oxidation state of the fume stream since the $O_2/(2CH_4+SiCl_4+GeCl_4)$ ratio increases as the $CH_4$, $SiCl_4$, and $GeCl_4$ flows decrease. The increased effective oxidation state, in turn, decreases the amount of GeO(g) which is formed.

C. Experimental Results

Example 1

The effects on germania capture and migration of the increased fume, inner shield, and pre-mix oxygen flows described in section IV(B) above were confirmed by the following experiments.

Eight soot blanks were prepared using the OVD process. For each blank, each of the following laydown parameters was systematically varied: 1) total reactant ($SiCl_4+GeCl_4$) fume flow, 2) $GeCl_4/SiCl_4$ flow ratio, 3) fume oxygen flow, 4) inner-shield oxygen flow, 5) methane flow, and 6) pre-mix oxygen/methane flow ratio. The outer-shield oxygen flow was fixed at 7.5 slpm (standard liters per minute) for all blanks.

For the first four blanks, three conditions $(-,0,+)$ were used for each of the varied flows, while five conditions $(--,-,0,+,++)$ were used for the second four blanks. Each blank contained 32 to 34 test segments, with each segment consisting of 15 full (back and forth) laydown passes. The test segments were deposited on a rotating mandrel (bait rod), which was 70 centimeters long and upon which had been deposited 40 full passes of silica centerline soot. The value ranges for total reactant fume flow (FF) and methane flow (CH) used for the first 16 test segments of each blank (the "inner half") differed from those used for the last 16–18 segments (the "outer half"). The specific flows used are shown in Tables 1–4.

The combination of flows for different blank segments was varied in order to observe interaction between different flow values for different variables. In eight or nine segments in each blank, all of the gas flows were set to the median (0) values. These segments served as controls and allowed inter-blank variability to be examined. Also, as germania collection efficiency is known to vary as a function of segment radius, these control segments were used to subtract out the effect of radius from the axial trend data.

In particular, to subtract out the effect of diameter from the germania capture data, equations of the following form were fitted to the germania data for the control segments:

$$GeO_2(Dia) = a_1 + a_2 \cdot Dia + a_3 \cdot (Dia)^2 \qquad (2)$$

Similarly, to subtract out the effect of diameter from the axial trend data, equations of the following form were fitted to the mid-specimen minus tip-specimen data (see below) for the control segments:

$$AxDif(Dia) = a_1' + a_2' \cdot Dia + a_3' \cdot (Dia)^2 \qquad (3)$$

As discussed below in Example 2, these equations 2 and 3 were subsequently used to calculate optimized flows for the soot laydown burner.

The preforms were dried and consolidated in a consolidation furnace having a silica muffle. During drying/consolidation, a mixture of He and $Cl_2$ was passed down the centerline of the preform, and a mixture of He and $O_2$ flowed from the bottom of the muffle up around the consolidating preform. Once the preform pores closed, the flow was replaced with a He flow. The temperatures during drying/consolidation ranged from about 920 degrees C. to a peak temperature of about 1405 degrees C. The preforms used in this experiment were for core cane blanks (including a portion of the cladding) to be subsequently stretched into cane and overclad with cladding soot to form fiber preforms. However, this was done as a matter of convenience, as the fibers under consideration included metal oxide dopant only in the core of the resulting fiber. The present invention is equally applicable to soot laydown processes for preforms that are drawn into fibers without stretching into cane and subsequent cladding laydown.

After consolidation, cross-sections of the blanks were cut from positions located about 10 inches from the blank tip ("mid-specimen") and about 2 inches from the blank tip ("tip-specimen"). Microprobe measurements of $SiO_2$ and $GeO_2$ concentrations were made by conventional means. Broad and focused microprobe scans were made to observe variations in overall $GeO_2/SiO_2$ concentration and minute variations within each segment. Striae were observed in these measurements, consistent with the repetitive scanning used in the OVD soot laydown process. The back-scattered electron images of FIG. 3 depict the effect of such compositional striae.

The experimental data for the eight blanks indicated that retained germania concentration increases with increases in fume $O_2$, inner-shield $O_2$ and to some extent pre-mix $O_2/CH_4$ flow. The data also indicated that retained germania concentration decreases with increased methane flow.

The data further indicated that axial germania variation is reduced by increases in fume $O_2$ and inner-shield $O_2$, and that axial germania variation is increased by increases in reactant fume flow and $CH_4$ flow.

Overall, the data demonstrated that changes in flows which increase the oxidation state of the flame and, in particular, the oxidation state in the region of the fume tube result in more germania capture and smaller axial trends, both of which are highly desirable.

Example 2

This example illustrates a procedure for selecting (optimizing) burner flows so as to achieve one or more of 1) increased dopant collection efficiency, 2) reduced axial trends, and/or 3) increased process stability, using experimental data of the type derived in Example 1.

In general terms, in accordance with the experimental portion of the procedure, i.e., the portion illustrated in Example 1, one or more test preforms are prepared using the process and the burner configuration for which optimization is desired. During the preparation of the test preforms, each of the burner flows which is to be optimized is varied over its range of interest. The variations can be done one flow at a time or groups of flows can be varied simultaneously. In order to minimize the number of test preforms needed for the optimization, the preforms are preferably divided into segments with the flows varying between segments.

After the test preforms have been prepared, they are preferably consolidated and then measurements are made to determine the dopant concentrations in the various segments. If axial trends are to be minimized, measurements of dopant concentrations at different axial locations within a segment are also made.

In accordance with the analysis portion of the procedure, a function in the flow variables, e.g., a second order polynomial of the form $a_0 + a_1*f1 + a_2*f2 + a_3*f3 + a_4*f1^2 + a_5*f2^2 + a_6*f3^2 + a_7*f1*f2 + a_8*f1*f3 + a_9*f2*f3$ for a system in which three flows (f1, f2, and f3) are to be optimized, is fitted to the measured dopant concentration data using, for example, a conventional least squares fitting technique. Using the coefficients determined by the fitting process (e.g., $a_0$, $a_1$, $a_2$, $a_3$, $a_4$, $a_5$, $a_6$, $a_7$, $a_8$, $a_9$), the values of the flow variables (e.g., F1, F2, and F3) which lie in the permitted range of the flow variables and which maximize dopant collection are then calculated. (The permitted range of the flow variables is the range of flows which can actually be used in practice because of burner or other process constraints.)

If axial trends are also to be minimized, a separate function in the flow variables is fitted to the axial trend data. Using the coefficients determined by this fitting process, the values of the flow variables (e.g., F1', F2', and F3') which lie in the permitted range of the flow variables and which minimize axial trends are then calculated.

Finally, if process stability and, in particular, dopant concentration stability, is also to be optimized, the first derivatives of the dopant concentration function with regard to each of the flow variables are calculated, squared, and summed to form a "sum of squares" stability function (e.g., $*a_1 + 2*a_4*f1 + a_7*f2 + a_8*f3)^2 + (a_2 + 2*a_5*f2 + a_7*f1 + a_9*f3)^2 + (a_3 + 2*a_6*f3 + a_8*f1 + a_9*f2)^2)$. The values of the flow variables (e.g., F1", F2", and F3") which lie in the permitted range of the flow variables and which minimize this function are then calculated.

In general, the values of the flow variables which maximize dopant collection will not be the same as those which minimize trends, and similarly, neither of these sets of values will be the same as the values which maximize stability. However, in accordance with the invention, it has been found that each of these optimizations involves increased oxygen flows, i.e., the production of an oxidizing atmosphere. That is, the values for the flow variables which increase dopant capture, the values which minimize trends, and the values which increase stability all involve the production of an oxidizing atmosphere.

Accordingly, the values of the flow variables ultimately used in the production of preforms can be a compromise between the various sets of optimal values, with the compromise values being chosen based on which optimization is most important to the particular product being produced. Alternatively, the compromise values can be determined mathematically by simultaneously optimizing the three functions using suitable weighting functions to account for the different magnitudes and units of the functions. For example, the dopant concentration function can be added to the reciprocals of the axial trend and sum of squares functions, each function being multiplied by a weighting factor, the sum of the weighting factors equaling one, and values of the flow variables which lie in the permitted range of the flow variables and which maximize this combined function can be calculated.

The analysis portion of the optimization procedure was applied to the experimental data of Example 1 as follows. First, using equations 2 and 3 and the measured experimental date of Example 1, the following parameters were calculated:

$$Resid(GeO_2) = GeO_2 - GeO_2(Dia) \qquad (4)$$

and $$AxDif(GeO_2) = Mid(GeO_2) - Tip(GeO_2) - AxDif(Dia) \qquad (5)$$

where $Resid(GeO_2)$ is the residual germania concentration in the mid specimen after the effect of diameter on germania concentration has been subtracted out, and $AxDif(GeO_2)$ is the difference in germania concentration between the mid and tip specimens, again after the effect of diameter has been subtracted out.

Next, polynomials of the following form were fitted to the $Resid(GeO_2)$ and $AxDif(GeO_2)$ data:

$$\begin{aligned}Resid(GeO_2) = &\ C0 + C1*G/S + C2*FO + C3*IO + \\&C4*CH + C5*PMO/CH + C6*FF + C7*G/S*FO + \\&C8*G/S*IO + C9*G/S*CH + C10*G/S*MO/CH + \\&C11*G/S*FF + C12*FO*IO + C13*FO*CH + \\&C14*FO*MO/CH + C15*FO*FF + C16*IO*CH + \\&C17*IO*MO/CH + C18*IO*FF + C19*CH*MO/CH + \\&C20*CH*FF + C21*MO/CH*FF + C22*(G/S)^2 + \\&C23*(FO)^2 + C24*(IO)^2 + C25*(CH)^2 + \\&C26(MO/CH)^2 + C27*(FF)^2\end{aligned} \qquad (6)$$

and $$\begin{aligned}AxDif(GeO_2) = &\ D0 + D1*G/S + D2*FO + D3*IO + \\&D4*CH + D5*PMO/CH + D6*FF + D7*G/S*FO + \\&D8*G/S*IO + D9*G/S*CH + D10*G/S*MO/CH + \\&D11*G/S*FF + D12*FO*IO + D13*FO*CH + \\&D14*FO*MO/CH + D15*FO*FF + D16*IO*CH + \\&D17*IO*MO/CH + D18*IO*FF + D19*CH*MO/CH + \\&D20*CH*FF + D21*MO/CH*FF + D22*(G/S)^2 + \\&D23*(FO)^2 + D24*(IO)^2 + D25*(CH)^2 + \\&D26(MO/CH)^2 + D27*(FF)^2\end{aligned} \qquad (7)$$

where FO=fume oxygen flow, IO=inner-shield oxygen flow, CH=methane flow, PMO=pre-mix oxygen flow, FF=total reactant fume flow, G/S=GeCl$_4$/SiCl$_4$ flow ratio, and all flows are in units of standard liters per minute (slpm). These equations include coefficients for linear effects, two-way interactive effects, and quadratic effects. Higher order polynomials or other functions can be used to perform the fitting and in some cases may be needed to fit the experimental data. For the data derived in Example 1, however, the polynomials of equations 6 and 7 were found to provide an adequate fit (see below).

The fitting was performed using three sets of polynomials: one for the outer halves of blanks 1–4, one for the inner halves of blanks 5–8, and one for the outer halves of blanks 5–8. The coefficients were determined using a least squares fitting routine which employed "F tests" to determine the statistical significance of each term. A typical set of coefficients for the outer halves of blanks 5–8 is shown in Table 5. As illustrated by this table, only a limited number of terms remained after the fitting process. Each of the three fits included terms 0 through 6, i.e., the linear terms; the higher order terms which were found statistically significant varied from fit to fit.

The quality of the fits of the regression equations to the Resid($GeO_2$) data was found to be quite good with $R^2$ values in the range from 0.81 to 0.93. The quality of the fits of the equations to the AxDif($GeO_2$) data was not as good ($R^2$ values in the range from 0.60 to 0.76), but still was reasonable.

Using the regression equations, a computer search was made over the flow conditions tested in Example 1 to find values for the flow parameters which maximized germania collection, minimized axial trends, and maximized stability. The search for the maximum for germania collection was performed using equation 6 and the various sets of coefficients calculated from the experimental data as described above.

The search for the minimum trends was performed using a modification of equation 7. Specifically, in searching for flows that yield a minimum value in the axial germania difference, one wants a minimum in Mid($GeO_2$) - Tip($GeO_2$), and not a minimum in AxDif($GeO_2$) as defined by equation 5. Therefore, values of AxDif(Dia) were added to the regression equations for AxDif($GeO_2$) so as to obtain values of Mid($GeO_2$) - Tip($GeO_2$). In particular, equation 3 was used to calculate the value of AxDif($GeO_2$) for the midpoint of each of the halves, and this value was added to the D0 coefficient for that half.

The search for maximized stability was performed using equation 6 and the following "sum of squares" stability function:

$$SumSq(GeO_2) = (dResid(GeO_2)/dFO)^2 + \\ (dResid(GeO_2)/dIO)^2 + (dResid(GeO_2)/dCH)^2 + \\ (dResid(GeO_2)/dPMO)^2 + (dResid(GeO_2)/dFF)^2 \quad (8)$$

where the first derivatives were calculated using equation 6.

The search produced three sets of optimal flow values. These flow values were combined to produce simple, continuous algorithms suitable for controlling the flows to a burner of the type shown in FIG. 1 during the preparation of a preform having a parabolic index of refraction profile. In particular, the optimal flow values were combined to obtain values for the F0, F1, F2, Ptr, Ptot, A1, and A2 coefficients in the following expressions:

Flow
variable = $F0 + (F1 - F0)[(Pcur - 1)/(Ptr - 1)]^{A1}$
(Pcur less than or equal to Ptr) (9)

and

Flow
variable = $F1 + (F2 - F1)[(Pcur - Ptr)/(Ptot - Ptr)]^{A2}$ (Pcur greater than or equal to Ptr) (10)

where Pcur, Ptr, and Ptot are the current laydown pass number, the transition laydown pass number, and the total number of laydown passes for the preparation of the soot preform, respectively.

The values of the coefficients obtained by the optimization process are shown in Table 6. The methane flows called for by this algorithm are higher than those suggested by the optimization procedure. These higher values were chosen to obtain a core cane blank which was sufficiently dense and thus unlikely to split during laydown. Using the coefficients of Table 6, a preform was successfully prepared and consolidated.

A set of non-optimized coefficients for preparing the same type of preform are shown in Table 7. A comparison of these coefficients with those of Table 6 shows that the optimized system uses higher fume oxygen, inner-shield oxygen, and pre-mix oxygen than the non-optimized system. Also, the starting reactant fume flow for the optimized system is lower, the final reactant fume flow is about the same, and the methane flow starts out slightly lower and ends slightly higher.

In terms of oxidation state, the optimized system (Table 6) has $O_2/2CH_4$ ratios of 1.34, 1.34, and 0.89 for Pcur/Ptot equal 0, 0.65, and 1.0, respectively, i.e., the optimized system produces an oxidizing atmosphere throughout most of the laydown process. For comparison, the non-optimized system (Table 7) has $O_2/2CH_4$ ratios of 0.95, 0.81, and 0.77 at the same points in the process, i.e., the non-optimized system is non-oxidizing throughout the laydown process.

Using the coefficients of Tables 6 and 7 and equations 6-8, expected values of AxDif($GeO_2$), Resid($GeO_2$), and SumSq($GeO_2$) were calculated for a number of $GeCl_4/SiCl_4$ ratios. The results are shown in Table 8. The estimated improvements in AxDif($GeO_2$), Resid($GeO_2$), and SumSq($GeO_2$) shown in this table are significant.

Example 3

This example illustrates the effect of using an oxidizing atmosphere during laydown of the critical centerline portion of a blank.

A first core cane blank was prepared using the non-optimized algorithm of Table 7 with the germanium tetrachloride flows shown by the plus signs of FIG. 5. For reference, the fume oxygen flows for this algorithm are shown by the plus signs of FIG. 4.

Fibers were prepared from the tip and middle portions of the blank. The differential mode delay (DMD) for fiber prepared from the tip portion and for fiber prepared from the middle portion was determined, and the difference in the DMDs between the portions was calculated and plotted as a function of the normalized radius of the fiber squared. The results are shown in FIG. 6 as the curve marked "standard." As shown by this curve, the blank prepared using the algorithm of Table 7 had significant axial trends in the DMD parameter, i.e., on the order of 1.23 nanoseconds/kilometer.

A second blank was prepared using the same algorithm but with the fume oxygen and germanium tetrachloride flows shown by squares in FIGS. 4 and 5. Whereas the $O_2/2CH_4$ ratio at the beginning of laydown for the Table 7 algorithm was 0.95, i.e., non-oxidizing, the ratio when the increased fume oxygen flow of FIG. 4 was used was 1.03, i.e., the increased fume oxygen flow resulted in an oxidizing atmosphere during laydown of the center portion of the blank.

As with the first blank, fibers were prepared from the tip and middle portions of the second blank. The difference in DMDs between these portions was calculated, and the results are plotted in FIG. 6 as the curve marked "experiment." As shown by this curve, the blank prepared using an oxidizing atmosphere during centerline laydown had significantly reduced axial trends, i.e., 70% smaller trends, than the trends for the blank prepared using a non-oxidizing atmosphere.

In addition to this important result, the second blank's germania capture efficiency was 8% greater than that of the first blank. Moreover, fiber prepared from the second blank had excellent physical properties.

As shown by this example, the use of an oxidizing atmosphere results in significant improvements in the laydown process even if the oxidizing atmosphere is only used during a limited portion of the laydown procedure.

When axial trends are reduced in accordance with the present invention, a greater portion of an optical fiber preform blank will produce fiber meeting or exceeding a predetermined specification. For example, in the case of a multimode core cane blank for making a multimode fiber with a peak delta of approximately 2%, prior to the implementation of the invention about 65% of a 150 kilometer core cane blank could be used to manufacture optical fiber with bandwidth greater than 600 MHz·km. By using the present invention this percentage increased to approximately 90%. For multimode fiber with a peak delta of approximately 1%, similar high utilization percentage would be available using the present invention: i.e., for a 200 kilometer core cane blank, a similar high percentage of the blank could be used to manufacture optical fiber with bandwidth greater than 1500 MHz·km. These percentages assume a typical measurement length of at least 0.5–2.0 kilometers.

Other manufacturing processes, for example plasma inside deposition can be used to produce optical fiber blanks with limited axial variation, but these processes typically yield blanks from which less than about thirty (30) kilometers of optical fiber may be drawn, and these processes are not used to create core cane for subsequent overcladding.

TABLE 1
Flow Ranges for the First 16 Segments of Blanks 1-4

| Flow Variable | Low Value (−) | Mid Value (0) | High Value (+) |
|---|---|---|---|
| $GeCl_4/SiCl_4$ | 0.10 | 0.12 | 0.14 |
| Fume $O_2$ | 3.8 | 5.0 | 6.3 |
| Inner-Shield $O_2$ | 3.3 | 4.3 | 5.4 |
| Fume Flow | 1.0 | 1.5 | 2.0 |
| $CH_4$ | 8.5 | 9.5 | 10.5 |
| Pre-Mix $O_2/CH_4$ | 0.85 | 0.90 | 0.95 |

TABLE 2
Flow Ranges for the Second 16-18 Segments of Blanks 1-4

| Flow Variable | Low Value (−) | Mid Value (0) | High Value (+) |
|---|---|---|---|
| $GeCl_4/SiCl_4$ | 0.10 | 0.12 | 0.14 |
| Fume $O_2$ | 3.8 | 5.0 | 6.3 |
| Inner-Shield $O_2$ | 3.3 | 4.3 | 5.4 |
| Fume Flow | 2.0 | 2.8 | 3.5 |
| $CH_4$ | 12.5 | 13.5 | 14.5 |
| Pre-Mix $O_2/CH_4$ | 0.85 | 0.90 | 0.95 |

TABLE 3
Flow Ranges for the First 16 Segments of Blanks 5-8

| Flow Variable | Lowest Value (−−) | Low Value (−) | Mid Value (0) | High Value (+) | Highest Value (++) |
|---|---|---|---|---|---|
| $GeCl_4/SiCl_4$ | 0.220 | 0.226 | 0.240 | 0.254 | 0.260 |
| Fume $O_2$ | 4.00 | 4.44 | 5.50 | 6.56 | 7.00 |
| Inner-Shield $O_2$ | 3.50 | 3.94 | 5.00 | 6.06 | 6.50 |
| Fume Flow | 1.00 | 1.15 | 1.50 | 1.85 | 2.00 |
| $CH_4$ | 7.50 | 7.94 | 9.00 | 10.06 | 10.50 |
| Pre-Mix $O_2/CH_4$ | 0.945 | 0.99 | 1.10 | 1.21 | 1.255 |

TABLE 4
Flow Ranges for the Second 16 Segments of Blanks 5-8

| Flow Variable | Lowest Value (−−) | Low Value (−) | Mid Value (0) | High Value (+) | Highest Value (++) |
|---|---|---|---|---|---|
| $GeCl_4/SiCl_4$ | 0.040 | 0.046 | 0.060 | 0.074 | 0.080 |
| Fume $O_2$ | 4.00 | 4.44 | 5.50 | 6.56 | 7.00 |
| Inner-Shield $O_2$ | 3.50 | 3.94 | 5.00 | 6.06 | 6.50 |
| Fume Flow | 2.00 | 2.22 | 2.75 | 3.28 | 3.50 |
| $CH_4$ | 12.00 | 12.37 | 13.25 | 14.13 | 14.50 |
| Pre-Mix $O_2/CH_4$ | 0.945 | 0.99 | 1.10 | 1.21 | 1.255 |

TABLE 5
Statistically Signficant Flow Coefficients for the Second Halves of Blanks 5-8

| C Coeff Number | C Coeff Value | D Coeff Number | D Coeff Value |
|---|---|---|---|
| C0 | 4.06 | D0 | 14.3 |
| C1 | −78.4 | D1 | −35.1 |
| C2 | 0.165 | D2 | −0.102 |
| C3 | 0.228 | D3 | 0.684 |
| C4 | −0.340 | D4 | −0.002 |
| C6 | −1.02 | D5 | −28.6 |
| C11 | 23.7 | D6 | 0.150 |
| C22 | 567 | D9 | 8.03 |
| | | D11 | 7.72 |
| | | D16 | −0.061 |
| | | D22 | −702 |
| | | D26 | 13.0 |

TABLE 6
Optimized Algorithm*

| Flow Variable | F0 | F1 | F2 | Ptr** | Ptot** | A1 | A2 |
|---|---|---|---|---|---|---|---|
| $SiCl_4$ | 1.20 | 1.56 | 3.28 | 414 | 1050 | 1 | 1 |
| Inner-Shield $O_2$ | 6.50 | 6.50 | 6.50 | 0 | 1050 | 1 | 1 |
| Outer-Shield $O_2$ | 4.99 | 4.99 | 9.90 | 0 | 1050 | 1 | 1 |
| Fume $O_2$ | 4.90 | 4.90 | 8.09 | 648 | 1050 | 1 | 1 |
| Pre-Mix $O_2$ | 6.25 | 6.25 | 14.48 | 0 | 1050 | 1 | 0.457 |
| $CH_4$ | 6.57 | 6.57 | 16.25 | 0 | 1050 | 1 | 0.968 |
| $GeCl_4$ | 0.42 | 0.46 | 0 | 300 | 1050 | 1.4 | 2.52 |

*F0, F1, F2 are the starting, intermediate, and final flows, respectively. Ptr indicates the transition laydown pass number where the rate of change of the flow makes a transition, i.e., from equation 9 to equation 10. Flow units are standard liters per minute (slpm).
**One direction passes.

TABLE 7
Non-Optimized Algorithm*

| Flow Variable | F0 | F1 | F2 | Ptr** | Ptot** | A1 | A2 |
|---|---|---|---|---|---|---|---|
| $SiCl_4$ | 1.86 | 3.16 | 3.16 | 470 | 470 | 1 | 1 |
| Inner-Shield $O_2$ | 3.614 | 5.00 | 5.00 | 470 | 470 | 1 | 1 |
| Outer-Shield $O_2$ | 4.946 | 9.852 | 9.852 | 470 | 470 | 1 | 1 |
| Fume $O_2$ | 4.096 | 5.90 | 5.90 | 470 | 470 | 1 | 1 |
| Pre-Mix $O_2$ | 5.937 | 12.816 | 12.816 | 470 | 470 | 1 | 1 |
| $CH_4$ | 7.153 | 15.410 | 15.410 | 470 | 470 | 1 | 1 |

TABLE 7-continued

Non-Optimized Algorithm*

| Flow Variable | F0 | F1 | F2 | Ptr** | Ptot** | A1 | A2 |
|---|---|---|---|---|---|---|---|
| GeCl₄ | 0.46 | 0.55 | 0 | 135 | 470 | 1.48 | 2.52 |

*F0, F1, F2 are the starting, intermediate, and final flows, respectively. Ptr indicates the transition laydown pass number where the rate of change of the flow makes a transition, i.e., from equation 9 to equation 10. Where Ptr = Ptot, only equation 9 is used. Flow units are standard liters per minute (slpm).
**Two direction passes.

TABLE 8

Calculated Values of AxDif(GeO₂), Resid(GeO₂), and SumSq(GeO₂) for Optimized and Non-Optimized Algorithms

| GeCl₄/ SiCl₄ | Optimized Algorithm | | | Non-Optimized Algorithm | | |
|---|---|---|---|---|---|---|
| | AxDif | Resid | SumSq | AxDif | Resid | SumSq |
| 0.26 | −0.84 | 1.1 | 0.73 | 1.0 | −1.3 | 4.1 |
| 0.24 | 0.73 | 0.20 | 1.2 | 2.5 | −3.2 | 4.7 |
| 0.22 | 1.0 | −1.9 | 0.89 | 3.6 | −5.2 | 5.3 |
| 0.14 | −0.82 | 4.5 | 6.8 | 0.64 | −5.1 | 16. |
| 0.12 | −0.43 | 3.1 | 3.7 | 0.77 | 2.3 | 8.9 |
| 0.10 | −0.13 | 1.0 | 2.6 | 0.88 | −0.68 | 4.6 |
| 0.08 | 2.0 | 1.6 | 0.96 | 2.9 | 1.5 | 0.96 |
| 0.06 | 2.0 | 0.16 | 0.36 | 2.9 | −0.04 | 0.36 |
| 0.04 | 1.3 | −0.93 | 0.20 | 2.3 | −1.3 | 0.20 |

What is claimed is:

1. A vapor deposition process for creating a porous silica based preform for a graded index multimode optical waveguide fiber having a core which includes $GeO_2$ and having a cladding, wherein
   a burner is used to react oxygen with a fuel in the presence of a reactant stream which includes a precursor of said $GeO_2$ to form soot, said oxygen, said fuel and said reactant stream being provided to and flowing from said burner, and
   said burner has at least one fuel passageway formed therein through which fuel leaves the burner, and at least one outlet structure inboard of said at least one fuel passageway,
   including the steps of
   a) supplying oxygen to the burner in said at least one fuel passageway and inboard of this passageway, and in the case of more than one fuel passageway, in the burner's outermost fuel passageway and inboard of this passageway,
   b) controlling the oxygen provided in said supplying step in the location specified in said supplying step during the creation of at least the part of the preform which forms the center of the fiber's core to an amount per unit time that is greater than the amount of oxygen stoichiometrically required per unit time to fully oxidize the fuel leaving the burner per unit time, and
   c) depositing said soot formed in said burner reaction to build up said porous silica based preform by the outside vapor deposition soot laydown technique in which at least a part of the porous glass preform is reheated as subsequent parts are deposited,
   wherein the providing of oxygen decreases the amount of GeO which is generated during the creation of the porous glass preform and which tends to migrate along the length of the preform.

2. The process of claim 1 wherein inert gases are not present in said reactant stream.

3. The process of claim 1 wherein majority of the multimode fiber prepared from the preform has a bandwidth greater than or equal to 800 MHz·km resulting at least in part from the refractive index profile control of the process.

4. A vapor deposition process for creating a porous silica based preform for a graded index multimode optical waveguide fiber having a core which includes $GeO_2$, and having a cladding, wherein
   a burner is used to react oxygen with a fuel in the presence of a reactant stream which includes a precursor of said $GeO_2$ to form soot, said oxygen, said fuel and said reactant stream being provided to and flowing from said burner,
   said burner has a series of concentric passageways formed therein including a first passageway which carries at least oxygen but not fuel, a second passageway which surrounds the first passageway and carries at least oxygen but not fuel, and a third passageway which surrounds the second passageway and carries at least fuel and oxygen,
   including the steps of
   a) supplying oxygen to said first, second, and third passageways during the creation of at least the part of the preform which forms the center of the fiber's core in a combined amount per unit time which is greater than the amount of oxygen stoichiometrically required per unit time to fully oxidize the fuel carried by the third passageway per unit time,
   b) depositing said soot formed in said burner reaction to build up said porous silica based preform by the outside vapor deposition soot laydown technique in which at least a part of the porous glass preform is reheated as subsequent parts are deposited,
   wherein the providing of oxygen decreases the amount of GeO which is generated during the creation of the porous glass preform and which tends to migrate along the length of the preform.

5. The process of claim 4 wherein inert gases are not present in said reactant stream.

6. The process of claim 4 wherein a majority of the multimode fiber prepared from the preform has a bandwidth greater than or equal to 800 MHz·km resulting at least in part from the refractive index profile control of the process.

7. A vapor deposition process for creating a porous silica based preform for a graded index multimode optical waveguide fiber having a core which includes $GeO_2$ and having a cladding, wherein
   a burner is used to react oxygen with a fuel in the presence of a reactant stream which includes a precursor of said $GeO_2$ to form soot, said oxygen, said fuel and said reactant stream being provided to and flowing from said burner, and
   said burner has at least one fuel passageway formed therein through which fuel leaves the burner, and at least one outlet structure inboard of said at least one fuel passageway,
   including the steps of
   a) supplying oxygen to the burner in said at least one fuel passageway and inboard of this passageway, and in the case of more than one fuel passageway, in the burner's outermost fuel passageway and inboard of this passageway,
   b) controlling the oxygen provided in said supplying step in the location specified in said supplying step during the creation of at least he part of the preform which forms the center of the fiber's core to an amount per unit time that is greater than the amount of oxygen stoichiometrically required per unit time to fully oxidize the fuel leaving the burner per unit time, and c) supplying fuel to the burner at a total fuel flow rate of at least about 6.5 standard liters per minute, wherein the providing of oxygen decreases the amount of GeO which is generated during the creation of the porous glass preform and which tends to migrate along the length of the preform.

8. The process of claim 7 wherein said at least one fuel passageway exits the face of said burner in a plurality of orifices arranged in one or more circles.

9. The process of claim 7 further comprising the step of depositing said soot formed in said burner reaction to build up said porous silica based preform by the outside vapor deposition soot laydown technique in which at least a part of the porous glass preform is reheated as subsequent parts are deposited.

10. The process of claim 7 wherein inert gases are not present in said reactant stream.

11. The process of claim 7 wherein a majority of the multimode fiber prepared from the preform has a bandwidth greater than or equal to 800 MHz·km resulting at least in part from the refractive index profile control of the process.

* * * * *

UNITED STATES PATENT AND TRADEMARK OFFICE
CERTIFICATE OF CORRECTION

PATENT NO.  : 5,203,897
DATED       : April 20, 1993
INVENTOR(S) : Dale R. Powers et al.

It is certified that error appears in the above-identified patent and that said Letters Patent is hereby corrected as shown below:

Col. 11, line 43 "$*a_1$" should read -- $(a_1$ --.

Signed and Sealed this

Nineteenth Day of July, 1994

Attest:

BRUCE LEHMAN

*Attesting Officer*  *Commissioner of Patents and Trademarks*